United States Patent
Greene

(10) Patent No.: US 8,033,506 B2
(45) Date of Patent: Oct. 11, 2011

(54) APPARATUS AND METHOD FOR REFUELING AIRCRAFT

(75) Inventor: Randall A. Greene, White Plains, NY (US)

(73) Assignee: Safe Flight Instrument Corporation, White Plains, NY (US)

(*) Notice: Subject to any disclaimer, the term of this patent is extended or adjusted under 35 U.S.C. 154(b) by 555 days.

(21) Appl. No.: 11/536,256

(22) Filed: Sep. 28, 2006

(65) Prior Publication Data
US 2008/0099628 A1    May 1, 2008

(51) Int. Cl.
*B64D 39/00* (2006.01)
(52) U.S. Cl. .................................... 244/135 A
(58) Field of Classification Search ............... 244/1 TD, 244/135 A, 135 R
See application file for complete search history.

(56) References Cited

U.S. PATENT DOCUMENTS

| | | | | |
|---|---|---|---|---|
| 3,917,196 A * | 11/1975 | Pond et al. | ...................... | 342/23 |
| 5,906,336 A * | 5/1999 | Eckstein | ................... | 244/135 A |
| 6,819,982 B2 * | 11/2004 | Doane | ............................ | 701/3 |
| 6,889,941 B1 * | 5/2005 | McElreath et al. | ....... | 244/135 A |
| 7,021,586 B2 * | 4/2006 | Bolling | ..................... | 244/135 A |
| 2005/0033488 A1 * | 2/2005 | Wittenberg | ...................... | 701/3 |
| 2005/0116109 A1 * | 6/2005 | Berard | ..................... | 244/135 A |
| 2007/0023570 A1 * | 2/2007 | Bernard | ...................... | 244/75.1 |

* cited by examiner

*Primary Examiner* — Joshua Michener
*Assistant Examiner* — Philip J Bonzell
(74) *Attorney, Agent, or Firm* — Morrison & Foerster LLP

(57) ABSTRACT

A method and apparatus for aiding pilots in aerial refueling comprises a primary auto-throttling system (ATS) disposed in a primary aircraft and a secondary ATS disposed in a secondary aircraft. The primary ATS includes logic which generates and transmits an anticipatory signal to the secondary ATS. Based upon the received anticipatory signal, the secondary ATS automatically controls a throttle of the secondary aircraft so as to maintain an airspeed of the primary aircraft. The anticipatory signals include rate of change information including at least one of rate of change of airspeed of the primary aircraft, rate of change of pitch of the primary aircraft, and rate of change of weight of the primary aircraft.

11 Claims, 5 Drawing Sheets

APPARATUS AND METHOD FOR REFUELING AIRCRAFT

BACKGROUND

The disclosed embodiments relate to aircraft refueling systems. More particularly, the embodiments relate to apparatus for and methods of aiding a pilot in controlling the airspeed of a tanker aircraft and a receiving aircraft.

Aerial refueling poses a unique flight control challenge. For example, a fighter aircraft must contend with a wake turbulence generated by a much larger tanker aircraft. Furthermore, an aerial refueling operation not only requires skill in approaching and attaching the refueling line, but once attached, staying attached to the tanker requires constant attention to synchronize the airspeed of the receiving aircraft with the airspeed of the tanker during constantly changing and, oftentimes hazardous conditions.

For example, as fuel is offloaded from the tanker aircraft, the pilot of the receiving aircraft must advance a throttle control to maintain constant airspeed as the gross weight of the aircraft increases. Conversely, as fuel is offloaded from the tanker, the pilot of the tanker must retard a throttle control to maintain a constant airspeed as the weight decreases. In most circumstances, radio communication between the pilots of the tanker and the receiving aircraft is the only tool supporting aerial refueling.

Accordingly, apparatus and methods for automatically controlling the airspeed of a primary and secondary aircraft are desirable.

BRIEF SUMMARY

In one aspect, a method of automatically controlling the airspeed of a secondary aircraft comprises generating at least one anticipatory signal predictive of an airspeed of the primary aircraft and operable to maintain the airspeed of the secondary aircraft at the airspeed of the primary aircraft.

In another aspect, an apparatus for regulating a throttle of a secondary aircraft comprises an auto-throttle system (ATS) disposed in a primary aircraft, the ATS operable to generate at least one anticipatory signal comprising a rate of change value of at least one of an airspeed, pitch and weight of the primary aircraft. The apparatus further comprises a data link communicating the anticipatory signal to the secondary aircraft wherein the at least one anticipatory signal is operable to modify the throttle of the secondary aircraft such that the secondary aircraft maintains an airspeed of the primary aircraft based upon the at least one anticipatory signal.

Another aspect of the invention includes a method of automatically controlling airspeed of a secondary aircraft, comprising receiving an anticipatory signal from a primary aircraft predictive of an airspeed of the primary aircraft and comprising rate of change information of the primary aircraft. The method includes generating a throttle control signal based upon the received anticipatory signal to maintain an airspeed of the secondary aircraft at the airspeed of the primary aircraft.

Another aspect of the invention includes an apparatus operable to aid pilots in aerial refueling, comprising a primary auto-throttling system (ATS) disposed in a primary aircraft, the primary ATS including logic operable to generate at least one anticipatory signal. A secondary ATS disposed in a secondary aircraft is operable to receive the at least one anticipatory signal wherein the at least one anticipatory signal is operable to maintain in the secondary aircraft an airspeed of the primary aircraft.

A further aspect includes a method for aiding pilots in aerial refueling, comprising monitoring an air speed, a pitch, and a weight of a tanker aircraft. The method further includes generating at least one rate of change signal based upon the monitored air speed, pitch, and the weight of the tanker aircraft, and transmitting the at least one anticipatory signal to a secondary aircraft. The received anticipatory signal is operable to control at least one throttle servo of the secondary aircraft.

Additional aspects and advantages of the disclosed embodiments are set forth in part in the description which follows, and in part are obvious from the description, or may be learned by practice of the disclosed embodiments. The aspects and advantages of the disclosed embodiments may also be realized and attained by the means of the instrumentalities and combinations particularly pointed out in the appended claims.

BRIEF DESCRIPTION OF THE DRAWINGS

The disclosed embodiments will hereinafter be described in conjunction with the appended drawings provided to illustrate and not to limit the disclosed embodiments, wherein like designations denote like elements, and in which.

DETAILED DESCRIPTION

Figure 1:
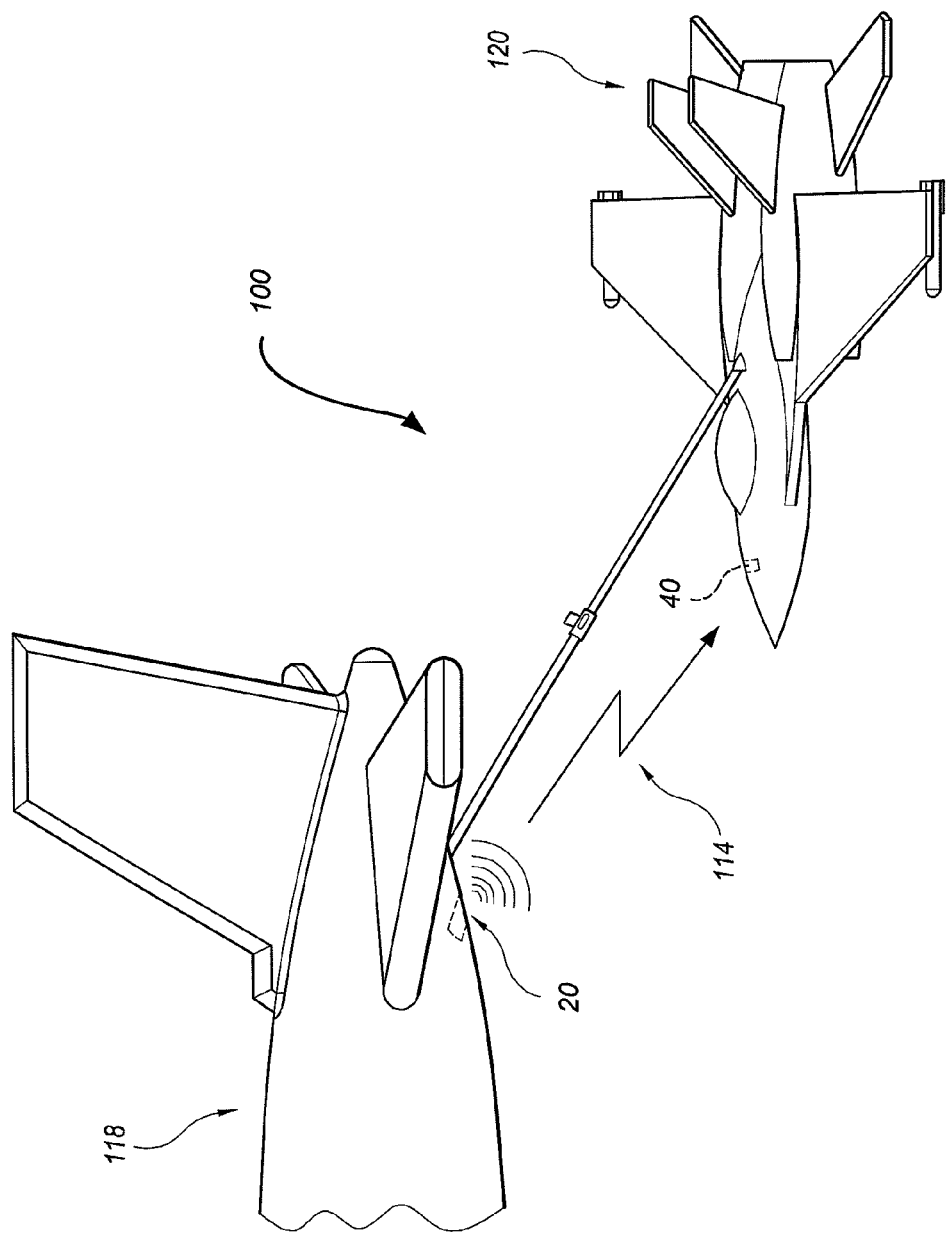
FIG. 1 is a side view of an aerial refueling system with which embodiments of the invention may be practiced to advantage.

FIG. 1 illustrates an aerial refueling apparatus 100 that includes a secondary aircraft 120 receiving fuel from a primary aircraft 118. Anticipatory signals that indicate rate of change information for various flight parameters are generated by an auto-throttling system (ATS) in the primary aircraft 118 are transmitted by a transmitter 20 over a data link 114 to a receiver 40 mounted on the secondary aircraft 120.

Data link 114 comprises a wireless transmission technology, e.g., optical, RF, etc., that transmits data from the primary aircraft 118 to the secondary aircraft 120. Non-limiting, an optical data link may be preferable due to a lower probability of detection and targeting by enemy forces.

Although placement of transmitter 20 and receiver 40 may not be a consideration when a RF data link is deployed, when using an optical data link, transmitter 20 may be preferably located near the tail of the primary aircraft 118, and the receiver 40 may be preferably disposed near the nose of the secondary aircraft 120.

Figure 2:
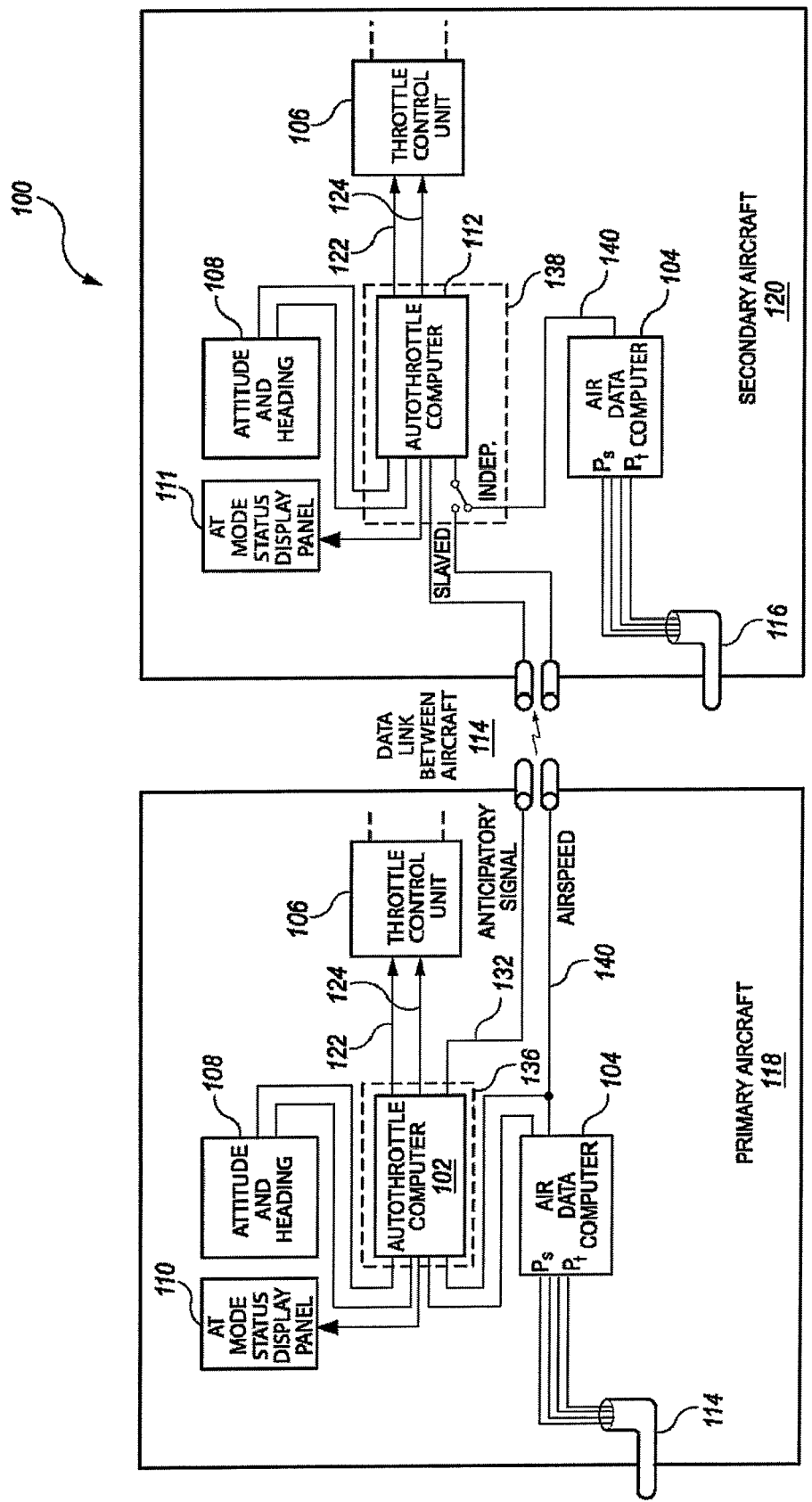
FIG. 2 is a representative block diagram of an aerial refueling system according to an embodiment.

FIG. 2 illustrates a representative block diagram of an aerial refueling system 100 comprising two aircraft, a tanker or primary aircraft 118 and a receiving or secondary aircraft 120. Each aircraft, 118, 120 comprises an automatic throttle system (ATS) 136, 138, which is communicatively coupled via data link 114 to the other aircraft. The ATS further comprises an auto-throttle computer 102, 112 that may be implemented in hardware, software or a combination of hardware and software. One ATS is designated as a primary ATS 136 and the ATS in the other aircraft is designated as the secondary ATS 138.

During close formation flying, e.g., aerial refueling, the primary ATS 136 transmits rate of change information, e.g., rate of airspeed change, rate of pitch change, and rate of fuel weight change, to the secondary ATS 138 over data link 114, thereby permitting the secondary aircraft 120 to maintain an airspeed equivalent to the primary aircraft with minimal adjustments to the throttle control mechanism of the secondary aircraft. In at least some embodiments, the speed of the secondary aircraft 120 is maintained within a predetermined range of the primary aircraft airspeed, e.g. an error and/or tolerance.

While the aerial refueling system 100 may operate with either the tanker aircraft 118 or the receiving aircraft 120 as the primary aircraft, the embodiments disclosed herein refer to the ATS of tanker aircraft 118 as the primary ATS 136 and the ATS of the receiving aircraft 120 as the secondary ATS 138. Accordingly, the airspeed of the receiving aircraft 120 is said to be "locked" to the airspeed of the tanker aircraft 118 based upon receipt by the secondary ATS 138 of at least one anticipatory signal 132 as well a current airspeed signal 140 from the primary ATS 136. Multiple fighter aircraft 120 may simultaneously receive fuel from a single tanker aircraft 118, the airspeed of each fighter aircraft locked to the airspeed of the tanker.

The secondary ATS 138 is sufficiently similar to the primary ATS 136 such that the following discussion relative to the primary ATS 136 may be applied to that of the secondary ATS 138. Differences between the primary ATS 136 and the secondary ATS 138 are identified. Furthermore, reference numbers pertaining to the secondary ATS 138 that differ from the primary ATS 136 are provided parenthetically.

Referring now to the primary aircraft 118, an air data computer 104 is provided that receives pilot and static pressures 114 (116) and calculates the aircraft's current indicated airspeed (IAS), mach number, altitude, vertical speed and other air mass information.

The ATS module 136 (138) further receives attitude and acceleration information from an attitude and heading reference system 108. In one exemplary embodiment, the auto-throttle computer 102 (112) maintains a current airspeed by generating throttle servo control signals 122 and 124 that are received by a throttle control unit 106 to adjust left and right throttle mechanisms as the weight of the tanker aircraft 118 decreases due to fuel being offloaded to at least one receiving aircraft 120.

The auto-throttle computer 102 of the tanker aircraft, i.e., primary aircraft 118, is further operable to generate at least one anticipatory signal 132 that is transmitted to the receiving aircraft, i.e., secondary aircraft 120, over data link 114. The anticipatory signal 132 comprises rate of change information pertaining to the tanker aircraft 118. Responsive to receipt of the anticipatory signal, the secondary ATS 138 causes the throttle control unit 106 to adjust the throttle of the receiving aircraft 120.

Based on the anticipatory signal 132 the secondary ATS 138 reacts more quickly than if the secondary ATS were provided with only the current airspeed of the primary aircraft 118. Furthermore, receipt of the anticipatory signal 132 by the secondary ATS may minimize large, and/or constant, throttle movements that may be necessary if the secondary ATS 138 received only the current airspeed. This is particularly important when, for example, the receiving aircraft 120 is a relatively lightweight fighter aircraft. In this case, the largest percentage gross weight change will be seen by the receiving aircraft 120 as opposed to the tanker aircraft 118 and therefore, the receiving aircraft's throttle will be more "active" than that of the tanker aircraft 118. Anticipatory signals transmitted to the fighter aircraft will minimize the throttle adjustments required to maintain a constant airspeed locked to that of the tanker aircraft.

The secondary ATS 138 may operate in a "slave" mode using signals received from the primary ATS 136 to control the throttle control unit 106 of the secondary aircraft 120. Alternatively, when the secondary ATS 138 is not controlled based on signals received from the primary ATS 136, i.e., "independent" mode, secondary ATS 138 is controlled by the airspeed signal of the secondary aircraft 120.

Still referring to FIG. 2, a auto-throttle mode status display panel 110, 111 may be disposed in one or both of the primary aircraft 118 and secondary aircraft 120, respectively. Non-limiting, the display panel 110, 111 may comprise control and indicators used by the ATS to display status of both the primary and secondary aircraft. For example, the display panel 110 connected to the primary ATS 136 may indicate status of the communication link 114, status of the signals comprising the anticipatory signal 132, as well as the status of the ATS 132. The display panel interconnected to the secondary ATS 138 may also indicate whether the secondary ATS 138 is in slave mode or independent mode, as well as indicating the airspeed of the primary aircraft 118 and the airspeed of the secondary aircraft 120.

Figure 3:
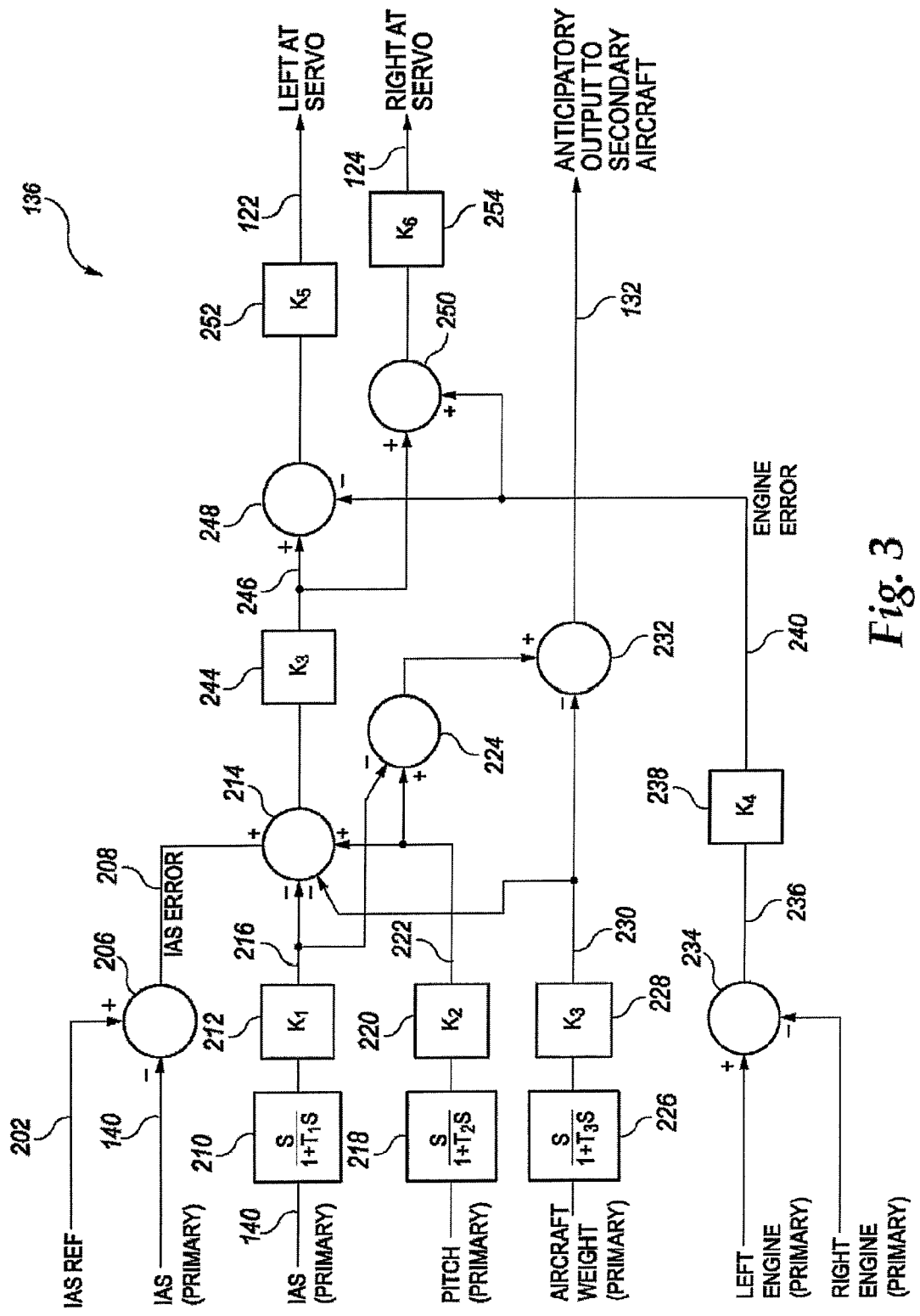
FIG. 3 is a function block diagram of an automatic throttle system (ATS) in a primary aircraft according to an embodiment.

FIG. 3 illustrates the primary ATS 136, which may be implemented in hardware and/or software and may include analog devices as well as digital signal processing devices. Primary ATS 136 receives flight status signals from a variety of sources and generates throttle servo control signals 122 and 124. In addition, ATS 136 generates at least one anticipatory output signal 132 to be transmitted to the secondary aircraft 120. The received flight status signals are received from other modules, including, but not limited to, the air data computer 104 and the attitude and heading module 108 (FIG. 1).

IAS reference signal 202 is a predetermined signal set by an authorized operator, such as the pilot, and indicates the desired airspeed of the tanker 118 and of the receiving aircraft 120, whose speed is locked to that of the tanker aircraft. An airspeed summing junction or summing amplifier 206 of the primary ATS 136 compares the IAS reference signal 202 to the current airspeed, i.e., the IAS signal 140 and generates an IAS error signal 208.

Airspeed summing amplifier 206 may be implemented in hardware and/or software and is in conjunction with other signals, controls the throttle of the primary aircraft, e.g., causing the throttle to advance if the current airspeed is lower than the IAS reference signal 202 and vice versa.

Although airspeed of the primary aircraft is used to control the throttle of the primary aircraft, it is not a predictor, that is, anticipatory, of future airspeed that may be used to smooth the throttle action of the primary or secondary aircraft. Anticipatory signals include rate of change information for, for example, rate of change of airspeed, rate of change of pitch, and rate of change of aircraft or fuel transfer weight.

Differentiator 210 receives a varying IAS signal and performs a differentiation to obtain an IAS rate, i.e., the rate of change of airspeed, based upon a time constant $T_1$. The output of differentiator 210 is adjusted by an amplifier 212 with a gain factor of $K_1$. The amplified signal is then summed along with the IAS error signal 208 and other signals by summing amplifier 214.

Differentiator 218, having a time constant of $T_2$, generates an output signal corresponding to a pitch rate of change that is modified by gain factor $K_2$ to generate output 222 that serves as another input to summing amplifier 214. Rate of change of pitch is determined because if the aircraft is pitched up in level flight, the aircraft will decrease speed. Accordingly, an increase in pitch will result in both the primary and secondary ATS 136, 138, to advance the appropriate throttle control unit.

Similarly, differentiator 226, having a time constant of $T_3$, generates a rate of change of the weight of the primary aircraft, i.e., the weight of the fuel transferred. Amplifier 228 with gain factor K3 amplifies the output of the differentiator 226 prior to being summed by amplifier 214. In other embodiments, an angle of attack sensor, not shown, may generate a signal that may be used instead of, or in addition to, the change in weight signal 230 of the primary aircraft 118.

Because the airspeed, pitch, and weight of the primary aircraft may change at different rates, the time constants $T_1$, $T_2$ and $T_3$ for their respective differentiators 210, 218, and 226 may differ. In some embodiments, the pitch rate of change is the fastest, and the weight rate of change the slowest.

Figure 4:
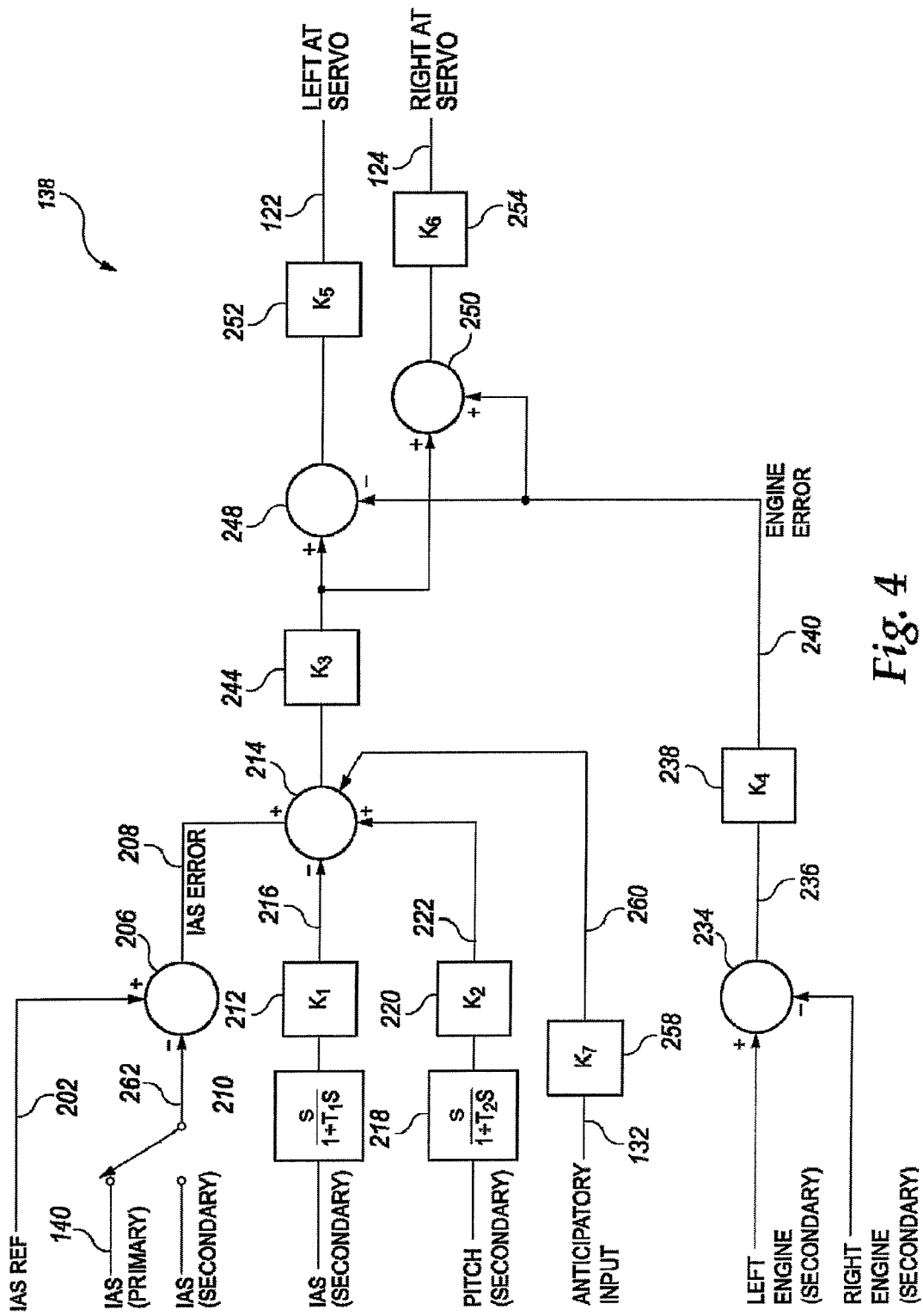
FIG. 4 is a functional block diagram of an automatic throttle system (ATS) in a secondary aircraft according to an embodiment.

Summing amplifier 214 generates an output signal that is received and amplified by an amplifier 244 with gain factor $K_3$ and which generates an output 246. Output 246 is split into two identical signals, each signal being modified by the engine error signal 240 that is used to keep the engines in sync as the airspeed is held to the IAS reference signal 202. Summing junctions 248 and 250 combine output 246 from amplifier 244 and engine error signal 240 in order to generate an output signal which is amplified by amplifiers 252 and 254 with gain factors $K_5$ and $K_6$, respectively. Output signal 122 and output signal 124 drive left and right auto-throttle servos, as shown in FIG. 4.

Summing junctions 248 and 250 may be identical and serve only to drive an independent left and right servo control signal 122 and 124. Alternatively, the output 246 of amplifier 244 may not be split at this point. Output signal 246 may modified by the engine error signal 240, the output of which may then be split into left and right servo control signals 122 and 124.

The engine error signal 240 is generated by summing amplifier 234, based upon signals received from the left and right engine. Amplifier 238 with gain factor $K_4$ amplifies the output signal 236 of summing amplifier 234 to generate an engine error signal 240.

Anticipatory signals 216, 222, and 230 may be combined by summing devices 224 and 232, generating a single anticipatory output signal 132. In at least some embodiments, the auto-throttle computer 102 of the primary aircraft 118 may be configured to transmit a plurality of anticipatory signals to the secondary aircraft 120, including, but not limited to signals 216, 222, and 230. As fuel is transferred from the tanker 118, not only is the tanker's primary ATS 136 operable to throttle back the tanker aircraft's throttle control to maintain an airspeed matching the IAS reference 202 signal, the secondary ATS 138 of the aircraft receiving fuel is modify the throttle control to maintain an airspeed consistent with the tanker.

FIG. 4 illustrates the secondary ATS 138, which receives an anticipatory signal 132 from the primary ATS 136 that may be combined with IAS error signal 208, IAS secondary rate change signal 216, and the pitch rate of change signal 222 of the secondary aircraft 120. Furthermore, secondary ATS 138 does not generate an anticipatory signal that is transmitted to another aircraft. In addition, the rate of change of the weight of the secondary aircraft may, in some embodiments, not be factored into the summing junction 214.

The secondary ATS 138 permits selection of the source of airspeed signal 262 that is compared to the IAS reference signal 202. In slave mode, the IAS of the primary aircraft, received over data link 114, is compared to the IAS reference signal 202. In independent mode, the IAS of the secondary aircraft is used in place of the IAS of the primary aircraft.

Figure 5:
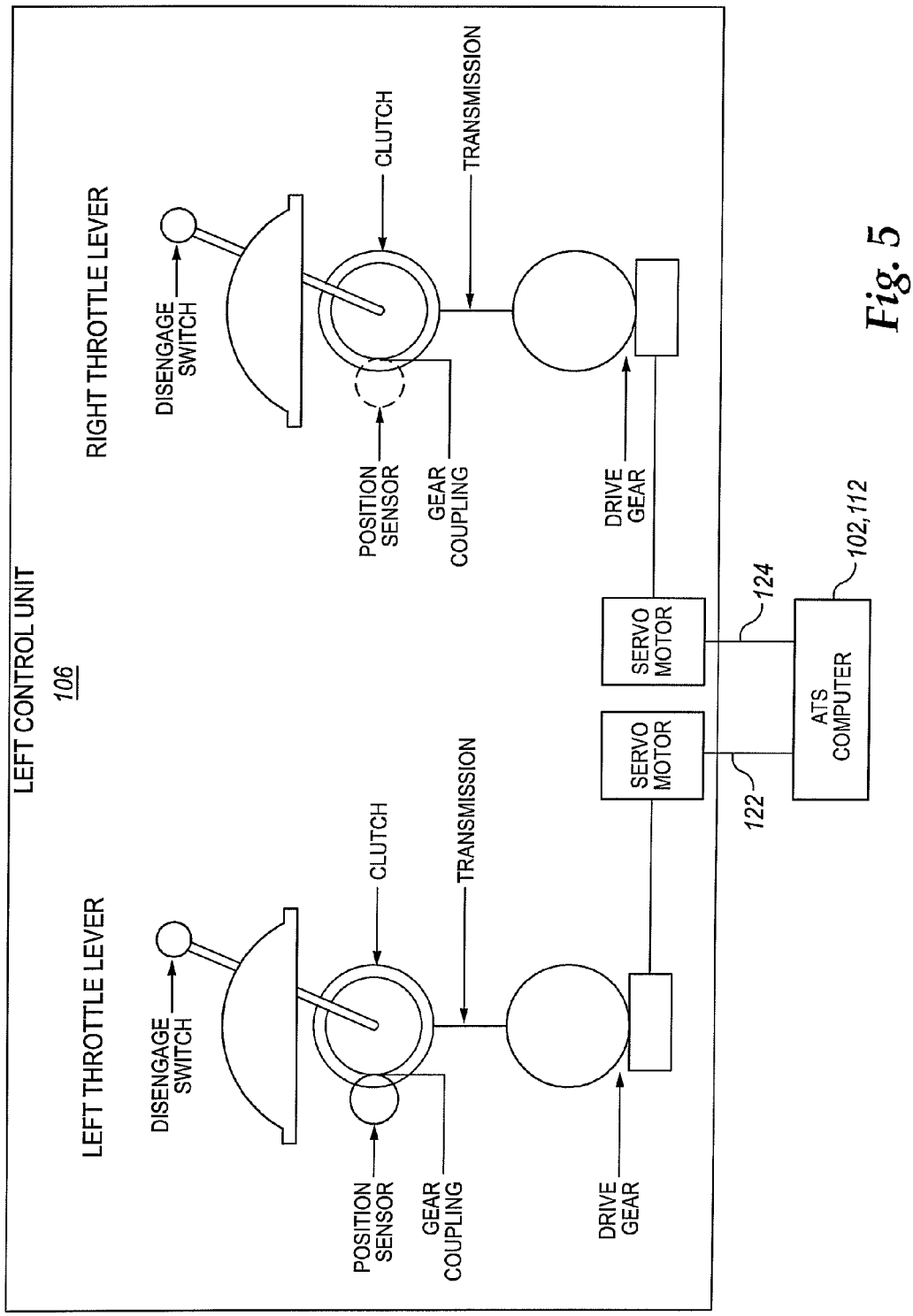
FIG. 5 is a functional block diagram of a throttle control unit according to an embodiment.

FIG. 5 is a high level block diagram illustrating the operation of the throttle control unit 106 and its interface with the auto-throttle computer 102 (112) of either the primary ATS 136 or the secondary ATS 138. Throttle control units are commonly known in the field of aircraft avionics and any throttle control unit that operates with primary ATS 136 and the secondary ATS 138 may be used without limitation.

While the foregoing disclosure shows illustrative embodiments, it should be noted that various changes and modifications could be made herein without departing from the scope of the described embodiments as defined by the appended claims. Furthermore, although elements of the described embodiments may be described or claimed in the singular, the plural is contemplated unless limitation to the singular is explicitly stated.

What is claimed is:

1. A system for regulating a throttle of a secondary aircraft, comprising:

an auto-throttle system (ATS) comprising an auto-throttle computer disposed in a primary aircraft, the ATS being configured to generate at least one anticipatory signal, the at least one anticipatory signal being predictive of at least one future flight characteristic of the primary aircraft based at least in part on a current rate of change value of at least one flight characteristic of the primary aircraft, the flight characteristic being at least one of an airspeed, pitch and weight of the primary aircraft; and a data link communicating the anticipatory signal to an auto-throttle computer of the secondary aircraft, wherein the at least one anticipatory signal predictive of the at least one future flight characteristic of the primary aircraft is configured to modify the throttle of the secondary aircraft such that the secondary aircraft maintains an airspeed of the primary aircraft based upon the at least one anticipatory signal.

2. The system of claim 1, wherein the ATS comprises at least one of:

an airspeed differentiator configured to generate a rate of change of airspeed;

a pitch differentiator configured to generate a rate of change of pitch attitude; and a weight differentiator configured to generate a rate of change of aircraft weight.

3. The system of claim 1, wherein the ATS comprises an airspeed differentiator time constant, a pitch differentiator time constant, and a weight differentiator time constant slower than the airspeed differentiator time constant and the pitch differentiator time constant.

4. The system of claim 1, wherein the at least one anticipatory signal is based at least in part on a sum of the rate of change values for each of a plurality of the flight characteristics, the apparatus further comprising a summing amplifier configured to sum the plural rate of change values.

5. A system operable to aid pilots in aerial refueling, comprising:

a primary auto-throttle system (ATS) comprising an auto-throttle computer disposed in a primary aircraft, the primary ATS including logic configured to generate at least one anticipatory signal, the at least one anticipatory signal being predictive of at least one future flight characteristic of the primary aircraft based at least in part on a current rate of change value of at least one flight characteristic of the primary aircraft; and a secondary ATS comprising an auto-throttle computer disposed in a secondary aircraft, the secondary ATS being configured to receive the at least one anticipatory signal;

wherein the secondary ATS is configured to maintain in the secondary aircraft an airspeed of the primary aircraft based on the at least one signal.

6. The system of claim 5, further comprising a wireless data communication link from the primary aircraft to the secondary aircraft, the wireless communication link configured to communicate the at least one anticipatory signal to the secondary ATS.

7. The system of claim 5, wherein the primary ATS is operable to control at least one throttle servo of the primary aircraft.

8. The system of claim 5, wherein the primary ATS further comprises a weight change rate module operable to generate a signal based upon a rate of change of at least one of weight and fuel transferred.

9. The system of claim 5, wherein the primary ATS comprises logic configured to generate the at least one anticipatory output signal based upon an airspeed rate signal, a pitch rate signal, and a rate of change of at least one of weight and fuel transferred from the primary aircraft.

10. The system of claim 5, wherein at least one of the primary aircraft and the secondary aircraft comprises an auto-throttle status display panel indicating the operational status of at least one of the primary ATS and the secondary ATS.

11. The system of claim 5, wherein the flight characteristic is at least one of an airspeed, pitch and weight of the primary aircraft.

* * * * *

UNITED STATES PATENT AND TRADEMARK OFFICE
CERTIFICATE OF CORRECTION

PATENT NO. : 8,033,506 B2  Page 1 of 1
APPLICATION NO. : 11/536256
DATED : October 11, 2011
INVENTOR(S) : Randall A. Greene It is certified that error appears in the above-identified patent and that said Letters Patent is hereby corrected as shown below:

At column 3, line number 36, please replace "pilot" with -- pitot --

Signed and Sealed this
Twentieth Day of December, 2011

David J. Kappos
*Director of the United States Patent and Trademark Office*